(12) United States Patent
Rutledge

(10) Patent No.: US 7,520,247 B2
(45) Date of Patent: *Apr. 21, 2009

(54) ANIMAL FOOD AND TREAT DISPENSER

(75) Inventor: Jerry D. Rutledge, P.O. Box 142444, Fayetteville, GA (US) 30214-2444

(73) Assignee: Jerry D. Rutledge, Fayetteville, GA (US)

(*) Notice: Subject to any disclaimer, the term of this patent is extended or adjusted under 35 U.S.C. 154(b) by 308 days.

This patent is subject to a terminal disclaimer.

(21) Appl. No.: 11/184,163

(22) Filed: Jul. 19, 2005

(65) Prior Publication Data

US 2005/0263082 A1    Dec. 1, 2005

Related U.S. Application Data

(63) Continuation-in-part of application No. 10/771,555, filed on Feb. 4, 2004, now Pat. No. 6,988,464.

(60) Provisional application No. 60/444,745, filed on Feb. 4, 2003.

(51) Int. Cl.
  *A01K 1/10* (2006.01)
  *A01K 39/00* (2006.01)
  *A01K 5/00* (2006.01)

(52) U.S. Cl. ............... 119/51.01; 119/52.1; 119/61.57; 119/53.5; 221/197; 221/287

(58) Field of Classification Search ............ 119/51.01, 119/53, 52.1, 64, 61.57, 346, 900, 51.11, 119/53.5, 61.2, 56.1, 65; D30/121; 221/197, 221/287, 263, 264, 196, 266, 7, 8, 312, 155, 221/242

See application file for complete search history.

(56) References Cited

U.S. PATENT DOCUMENTS 600,697 A * 3/1898 Schmidt ............... 194/294
1,746,501 A * 2/1930 Stamas ............... 221/135

(Continued)

FOREIGN PATENT DOCUMENTS

JP    01250195    * 10/1989

*Primary Examiner*—Andrea M Valenti
(74) *Attorney, Agent, or Firm*—Laurence P. Colton; Smith, Gambrell & Russell, LLP

(57) ABSTRACT

A manually operated dog treat dispensing machine capable of dispensing dog treats one at a time, the dispenser having a rectangular housing with a hinged housing door and hinged capital that serves as a food supply reservoir which is gravity fed into a spring loaded spindle chamber mounted on an axel and hand crank. Treats exit the dispenser through a chute output consisting of a hinged chute lid, two side walls and a base block and a retaining plate mounted in the end of the chute lid and adjacent to the spindle chamber acts as a stop preventing dispensing of more than one dog treat at a time. The dispenser also can function using a magazine that is inserted inside the rectangular housing area. Magazine stop tabs at the base of the magazine along with the retaining plate mounted on the chute lid prevent the dispenser from dispensing more than one dog treat at a time. Operation of the dispenser is performed by manually turning the hand crank mounted on the spindle axel, which rotates the spindle chamber forward, thus dispensing a dog treat through the output chute, with a return spring pulling the spindle chamber back to the upright position and ready for a new treat.

12 Claims, 15 Drawing Sheets

U.S. PATENT DOCUMENTS

| | | | |
|---|---|---|---|
| 1,780,124 A * | 10/1930 | Gibson | 194/294 |
| 1,928,556 A * | 9/1933 | Blaydes et al. | 194/299 |
| 2,311,632 A * | 2/1943 | Berger et al. | 221/241 |
| 2,791,201 A * | 5/1957 | Jacob, Sr. | 119/55 |
| 3,161,321 A * | 12/1964 | Mellion et al. | 221/266 |
| 3,313,452 A * | 4/1967 | Katz | 221/268 |
| 4,308,974 A * | 1/1982 | Jones | 221/196 |
| 6,988,464 B1 * | 1/2006 | Rutledge | 119/51.01 |
| 7,270,080 B1 * | 9/2007 | Kane | 119/51.01 |

* cited by examiner

ANIMAL FOOD AND TREAT DISPENSER

CROSS-REFERENCE TO RELATED APPLICATIONS

This patent application is a continuation-in-part based on and claiming priority on U.S. patent application Ser. No. 10/771,555 having a filing date of 4 Feb. 2004, now U.S. Pat. No. 6,988,464 which in turn is based on and claims priority on U.S. Provisional Patent Application No. 60/444,745 having a filing date of 4 Feb. 2003.

FEDERALLY SPONSORED RESEARCH

Not Applicable.

SEQUENCE LISTING OR PROGRAM

Not Applicable.

BACKGROUND OF THE INVENTION

1. Technical Field

This invention relates to animal food and treat dispensers, specifically to such dispensers that can be operated manually with or without a magazine.

2. Prior Art

As a dog owner I have often thought to myself that there had to be a better way of dispensing dog biscuits than from a cardboard box or a cookie jar. With this in mind I set out to invent a device that could hold a large supply of dog biscuits and then dispense them one at a time in a more convenient and easy manner from a centrally located station.

I also sought a solution to the way that the dog biscuits were being packaged and shipped by the manufacturer to the public, one that would be compatible with the dispenser. Instead of just being dumped in a box in a random fashion I invented a magazine that could be pre-loaded with the dog biscuits and sealed in a plastic sleeve by the manufacturer and then shipped out to the public. With the pre-loaded magazines being compatible with the dispenser, this would make loading and operation of the dispenser simple. Although the method of using the pre-loaded magazines with the dispenser is preferred, the dispenser will operate very well with out one. Without a pre-loaded magazine the loading time is longer and is performed manually.

Inventors have created several types of dispensers for delivering measured quantities of food from a supply receptacle. U.S. Pat. No. 3,568,893 to Becker (1971) discloses a dispenser using a chamber that coacts with a spring to dispense nuts or other items from a pivotal dispensing operation. This dispenser does not operate with a hand crank or axel and the measuring chamber is suited to nuts or other items. It has a simple pull handle one would use to operate the chamber. The housing used to store the food items keeps them in place in a random fashion.

U.S. Pat. No. 4,770,125 to Gold et al. (1988) discloses a dispenser capable of being operated by a domestic animal. This dispenser sends numerous items through its output chute when actuated by a domestic animal. This is a difficult and expensive dispenser to manufacture and has limited appeal. With my invention the dispenser is like a piece of art that is very pleasing to the eye and can be displayed just about any where. My dispenser displays the dog treats in a uniformed and attractive manner. The dog treats can be viewed at all times to determine the quantity of treats left in the rectangular housing or in the pre-loaded magazines. Numbers are provided on the glass for determining the quantity left. The dispenser is small in size but holds a large quantity of dog biscuits.

International patent WO 88/07324 to Gold (1988) discloses the same spring-biased dispenser mechanism for manually operated animal food dispensing machines as mentioned previously.

3. Objects and Advantages

Accordingly, besides the objects and advantages of the animal food and treat dispenser described above, several objects and advantages of the present invention are:

(A) To provide a centrally located fixture in which to store and dispense dog biscuits.
(B) To provide a mechanism in which to dispense dog biscuits one at a time while providing the convenience of no storage boxes.
(C) To provide a rectangular housing unit that displays the dog biscuits in a uniform manner and makes obvious to user the quantity in the dispenser.
(D) To provide a user the added convenience of being able to install pre-loaded magazines directly into the rectangular housing thus eliminating time and effort.
(E) To provide a manufacturer of dog biscuits a means in which to store and ship dog biscuits in a uniformed manner while being encased in a magazine that fits easily into the dispenser.
(F) To provide a manufacturer a cost and space saving means of both storing and shipping dog biscuits through use of magazine.

Other objects and advantages are to provide a user with the means to continually have a method in which to store and dispense dog biscuits without the constant hassle of reaching into a box for biscuits, while at the same time providing an attractive apparatus for dispensing dog biscuits. For a manufacturer of dog biscuits the cost savings could be immense. Being able to store and ship biscuits in a compact and uniform magazine would save both space and cost.

BRIEF SUMMARY OF THE INVENTION

In accordance with the present invention a dog biscuit dispenser comprises an upper rectangular housing for storing biscuits with or without a preloaded magazine. The lower section of the dispenser consists of a spindle chamber for dispensing dog biscuits through an output chute.

DETAILED DESCRIPTION OF THE PREFERRED EMBODIMENTS

Figure 1:
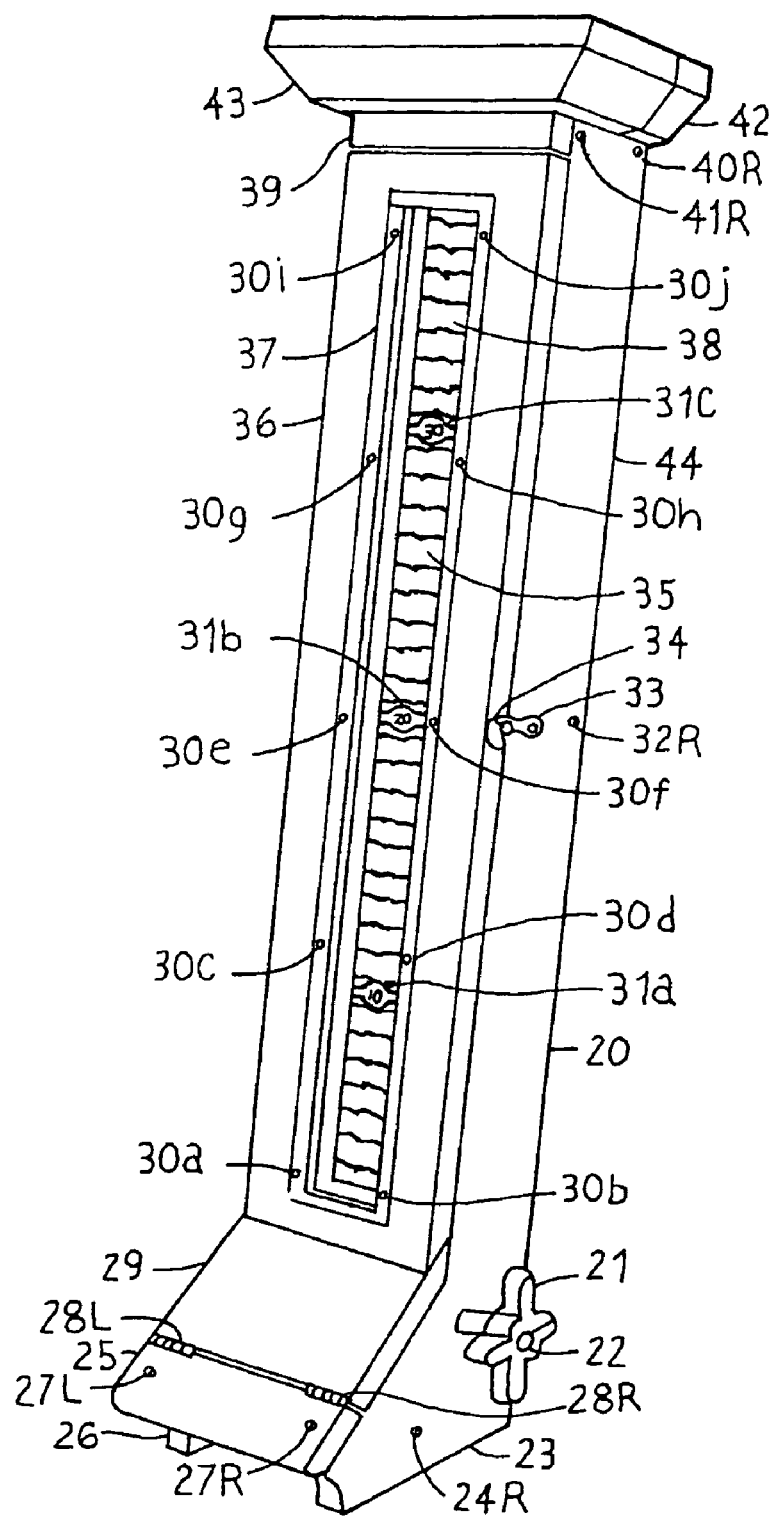
FIG. 1 shows the dispenser in a perspective view from the front and in the upright position.

FIG. 1 is a perspective view taken from the user's front and right side of an animal food and treat dispenser 20. Starting from the top, capitals 43,42 are joined by hinges (not shown) resting atop the door header 39 and is secured to the right wall 23 by threaded fastener 40R and others (not-shown). Threaded fastener 41R, located on the right side of rectangular housing 44, is decorative and not necessary. The rectangular housing door 36 is connected to the left wall 26 by hinges (not shown) and consist of glass trim 37 which is decorative and not necessary. The glass trim 37 is attached using fasteners 30a,b,c,d,e,f,g,h,i,j.

A treat stack 35 and cross-supports with quantity numbers 31a,b,c are visible through the glass 38. Threaded fasteners 24R secures the right wall 23 to the base block 56. A latch stud 34 is mounted in the right side edge of rectangular housing door 36 and a door latch 33 is mounted on the right wall 23. A threaded fastener 32R secures the mid-section of the right wall 23 to the rear wall 90. The chute lid 29 sits under the lower section of door 36 and is joined by two hinges 28L, 28R to the chute cover 25 and is secured by two threaded fasteners 27L, 27R to the left wall 26 and the right wall 23. The spindle hand crank 21 is fitted on the spindle axel 22 and is mounted horizontally through the right face of the right wall 23 and out the left wall 26. All of the parts can be made from wood, plastic or metal. The rectangular housing door 36 can be mounted from either the right wall 23 or left wall 26. The crank 22 can also be mounted from either the right or left end of the crank axel 22 along with the axel pin 60.

Figure 2:
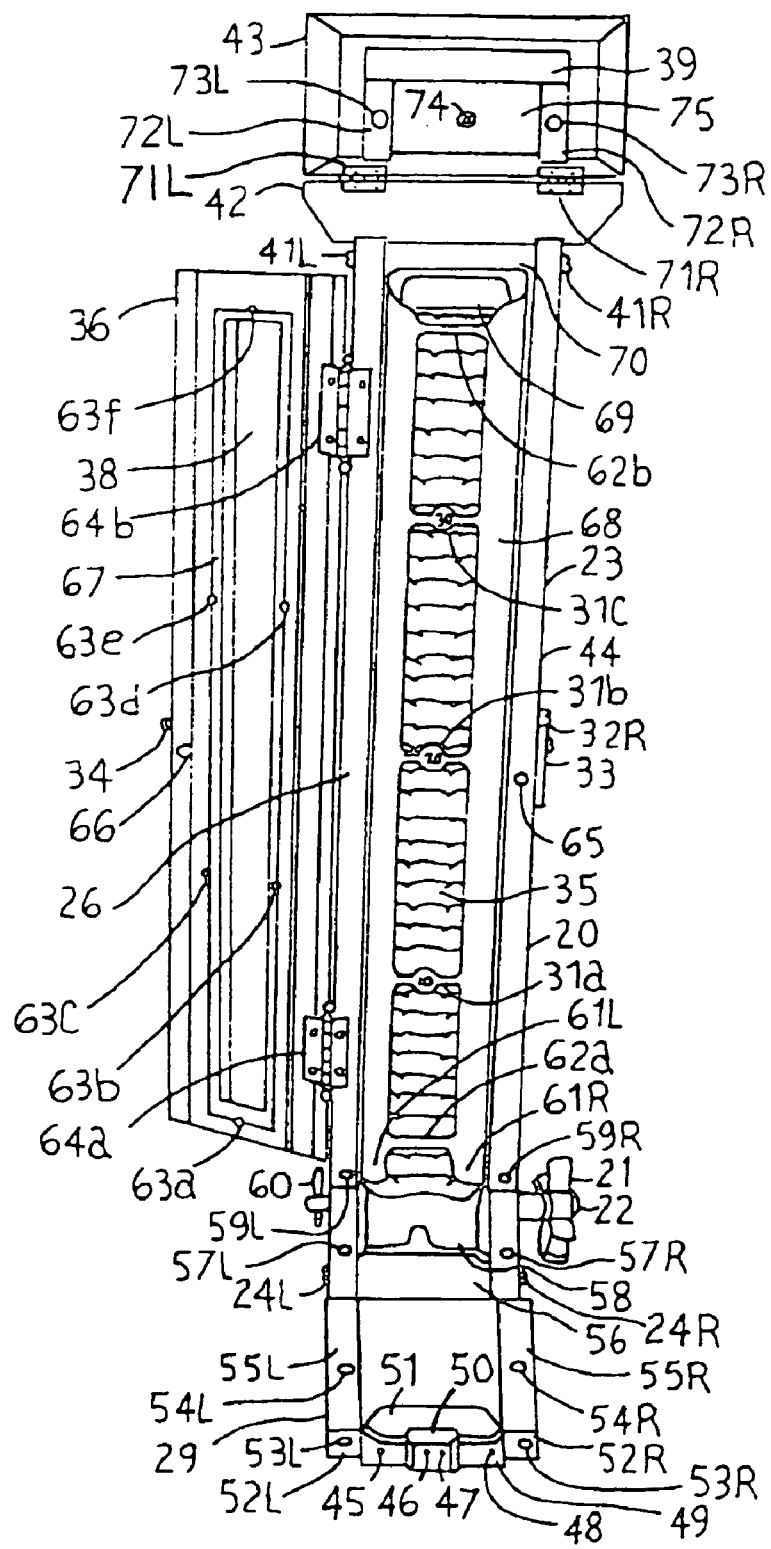
FIG. 2 shows the dispenser from the front with the compartments open and a magazine.

FIG. 2 is a perspective view of FIG. 1 showing the two piece capital 42, 43 atop the dispenser; connected by hinges 71L, 71R in the open position. A header block 75 is secured to the capital 43 by use of fastener 74 the header 39 is attached to the front of the header block 75. Two mortise areas 72L, 72R are located to the left and right of the header block 75. Magnets 73L, 73R are located in the mortise areas 72L, 72R and serve as pulls for the capital lid 43.

The rear capital piece 42 is attached to the exterior rear wall 90 by fasteners that are not shown. The rectangular housing door 36 is connected to the left wall 26 by use of two hinges 64a, 64b. A glass slot 67 is cut into the back side of the rectangular housing door 36 for glass 38 which is secured by using threaded fasteners 63a,b,c,d,e,f. The glass 38 could also be secured by points or glue etc. as a substitute for threaded fasteners. The right and left side edges of the door 36 are milled to fit around the front edge of the left 26 and right 23 walls. Magnets 66, 65 serve as pulls for the rectangular housing door 36. The door latch 33 and latch stud 34 secure the door 36 in the closed position.

The left wall 26 along with the rear interior wall 70 and the right interior wall 23 form a three walled area into which a magazine 68 is inserted. The left wall 26 and the right wall 23 are secured to the rear exterior wall 90 by threaded fasteners 32R and others not shown. Screws 41L, 41R are false fasteners and do not protrude through the right wall 23 or the left wall 26 and they are decorative only and not necessary. The magazine 68 consist of cross supports 62a, 62b and cross supports with quantity designation numbers 31a,b,c. These numbers are for the user to tell the number of treats 35 left. A handle and treat stop 69 is mounted at the top of the magazine 68 and a treat stack 35 is shown. At the bottom are treat stop tabs 61L, 61R. Magnets 59L, 59R, 57L, 57R are mounted into the lower portion of the right wall 23 and left wall 26 and act as pulls for the chute lid 29. The magnets 54L, 54R, 53L, 53R are mounted into the guide edges 55L, 55R and bevel edges 52L, 52R of the chute lid 29 and also act as pulls. All the magnets are mounted flush and set in adhesive. A crank axel 22 is mounted horizontally through holes (not shown) in the right wall 23, spindle 58 and left wall 26. A hand crank 21 has a center hole (not shown) and slides over the right end of the crank axel 22 and is held in place by a set screw 83. A rolling pin 60 which is decorative and not necessary is inserted vertically through a hole that is bored in the crank axel 22. The rolling pin 60 is held in place by gravity. The spindle base block 56 is secured to the right wall 23 and left wall 26 by threaded fasteners 24L, 24R and others not shown.

Mounted on the chute lid 29 is a retaining strip 49 and retaining plate 50 that is held into place with glue and fasteners 45, 46, 47, 48. A recess 51 is carved out of the underside of the chute lid 29.

Figure 3:
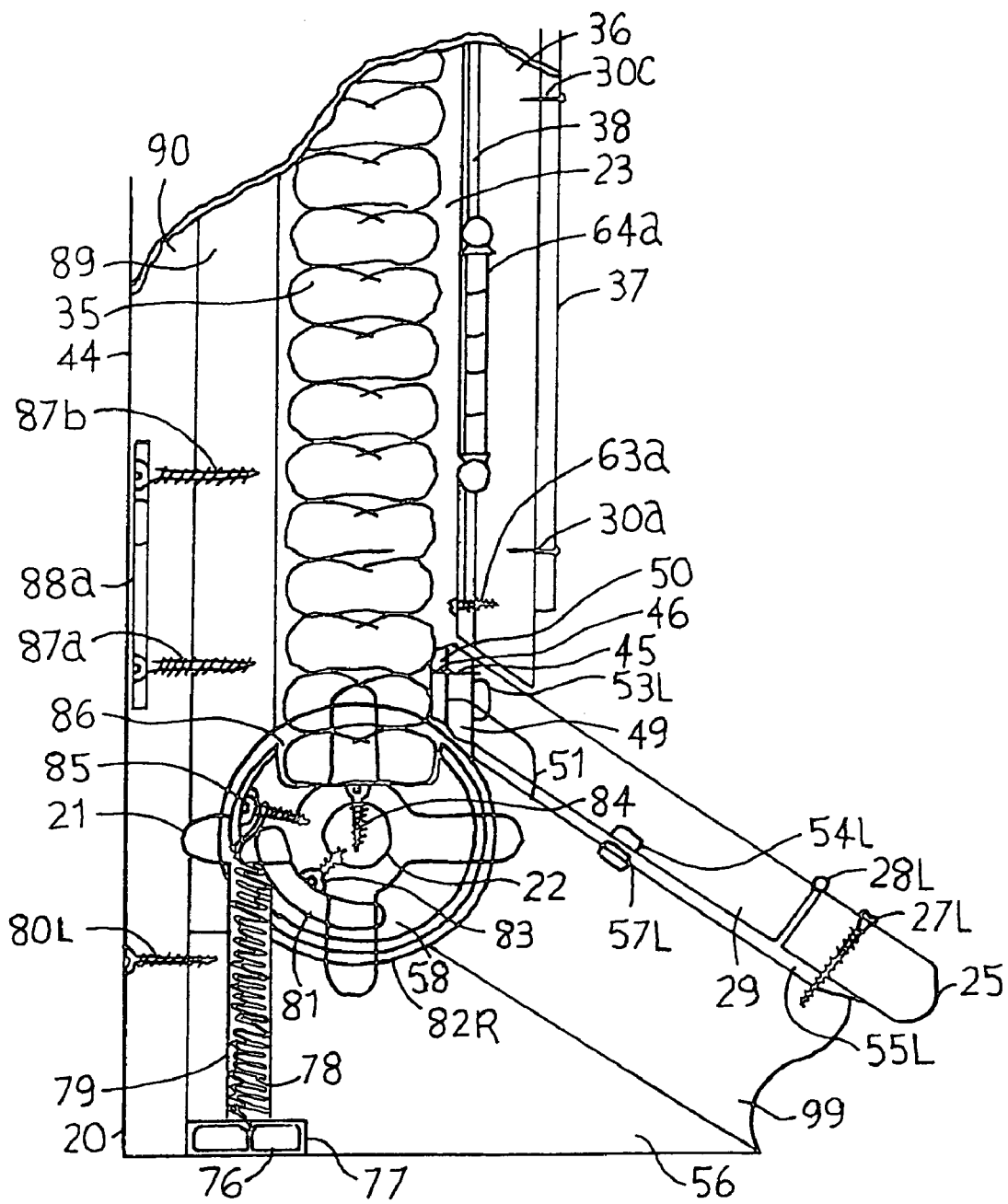
FIG. 3 shows the lower section of the dispenser from the left side without a magazine in use.

FIG. 3 is a fragmentary view of the lower half of FIG. 1 taken from the user's left side with the left wall 26 removed, and showing use without a magazine 68. A treat stack 35 is shown with the base treat sitting in the spindle chamber 86. A spindle rotation groove 81 is cut into the spindle 58. A circular recess 82R is made into the right wall 23 and the left wall 26 (not shown). The spindle 58 is held in place on the axel 22 by the spindle mounting screw 84. The crank 21 is held in place on the axel 22 by the crank mounting screw 83. The return spring 78 is connected to the back side of the spindle 58 by the return spring mounting screw 85. The return spring 78 is housed inside of the spring chamber 79 with the spring plug 76 being housed inside the plug chamber 77.

Located at the top of the rectangular housing 44, the rear exterior wall 90 can be seen mounted to the rear interior wall 89 by use of a mounting bracket 88a and fasteners 87a, 87b. When no magazine 68 is in use rear interior wall 89 is used. Also located on the front of the rectangular housing 44 is a door 36 connected to the left wall 26 by a hinge 64a. The door 36 has a trim piece 37 that is connected to the front of the door 36 using fasteners 30a, 30c. Located on the back side of the door 36 is glass 38 that is fastened to the door 36 using fastener 63a. Just below the door 36 the chute lid 29 can be seen where it is attached to the chute cover 25 by use of hinges 28L, 28R and connected to the right wall 23 by fastener 27. Chute lid magnets 54L, 53L can be seen as door closures where they meet magnet 57L and magnet 59L (not shown). Located on the top end of the chute lid 29 is a retaining strip 49 that is fastened to the chute lid 29 by fastener 45. The retaining plate 50 is fastened to the retaining strip 49 by fastener 46. Located under the top section of the chute lid 29 is the chute lid recess 51. Located under the chute cover 25 and chute lid 29 is the chute lid guide 55. Just under the chute lid 29 is the chute output 99. At the bottom of dispenser 20 is where the base block 56 is joined to the rear exterior wall 90 by use of fasteners 80.

The spindle base block 56 contains the return spring 78 and return spring chamber 79 which also extends into the rear interior wall 89 for a short distance. A groove such as return spring recess 116 is also cut into the spindle 58 to allow for rotation. At the base of the return spring chamber 79 is the plug chamber 77 containing the return spring plug 76. The return spring plug 76 has a groove (not-shown) into which the return spring 78 is attached. The rear exterior wall 90 has a mounting bracket 88a attached to it with fasteners 87a, 87b which extend into the rear interior wall 89. Threaded fastener 80L along with others (not shown) secure the rear exterior wall 90 to the spindle base block 56 as well as to the rear interior wall 89.

When used without a magazine 68 the rear interior wall 89 is thicker than it would be when using a magazine 68. The rear interior walls 89, 70 are interchangeable depending on the user's preference. Along with the door 36, hand crank 21, rolling pin 60 the spindle rotation groove 81 and the spindle rotation stop screw 101 can be mounted on either end of the spindle 58.

Figure 4:
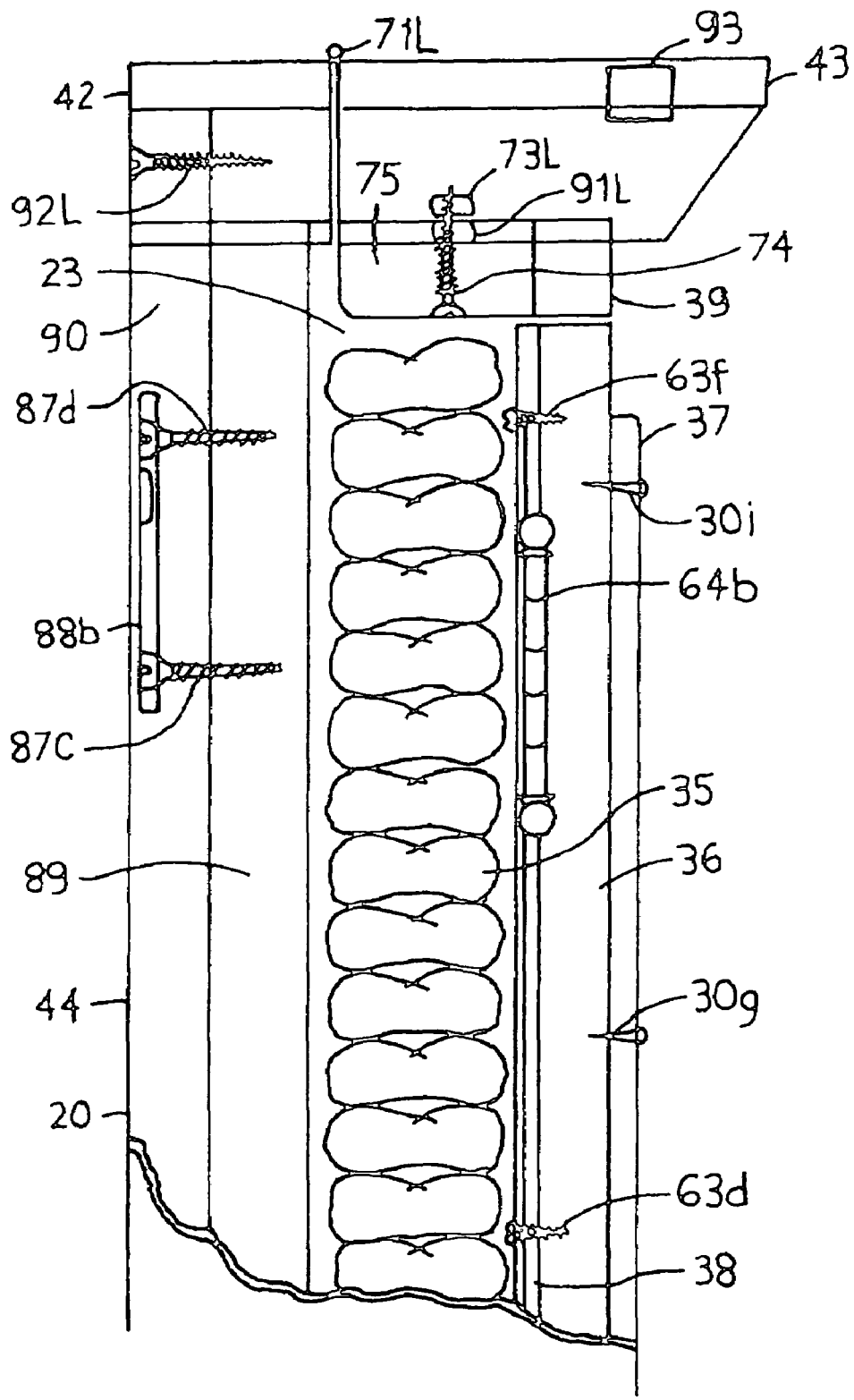
FIG. 4 shows the upper section of the dispenser from the left side without a magazine in use.

FIG. 4 is a fragmentary view of the upper half of FIG. 1 taken from the user's left side with the left wall 26 removed and a see through perspective of the capital rear 42 and capital lid 43 and showing use with out a magazine 68. A treat stack 35 is shown surrounded by a rear interior wall 89, a right side wall 23 and the rectangular housing door 36. Atop the upper half of dispenser 20 and rectangular housing 44 is where capital rear 42 and capital lid 43 are positioned and attached to the rear exterior wall 90 by threaded fastener 92L, 92R. Capital rear 42 and capital lid 43 are connected to each other by hinges 71L and hinge 71R (not shown). Counterweight 93 is recessed into the front section of capital lid 43 serving to offset the weight of the header 39 and header block 75 when the capital lid 43 is open. Counterweight 93 may or may not be needed to keep capital lid 43 in the open position. Header 39 is secured to header block 75. Header block 75 is attached to capital lid 43 by use of threaded fastener 74. Magnets 73L, 91L act as pulls to keep the capital lid 43 in the closed position. Pull magnets 73R, 91R are not shown. Rear exterior wall 90 is secured to the rear interior wall 89 using threaded fasteners 87c, 87d and others not shown. Mounting bracket 88b is recessed into the backside of the rear exterior wall 90.

On the front surface of dispenser 20 located below capital lid 43 is rectangular housing door 36. Trim 37 is secured to the front of rectangular housing door 36 using fasteners 30g, 30i and others not shown. Glass 38 is positioned on the back side of rectangular housing door 36 and secured by threaded fastener 63d, 63f and other not shown. Hinge 64b is used to attach rectangular housing door 36 to left wall 26.

Figure 5:
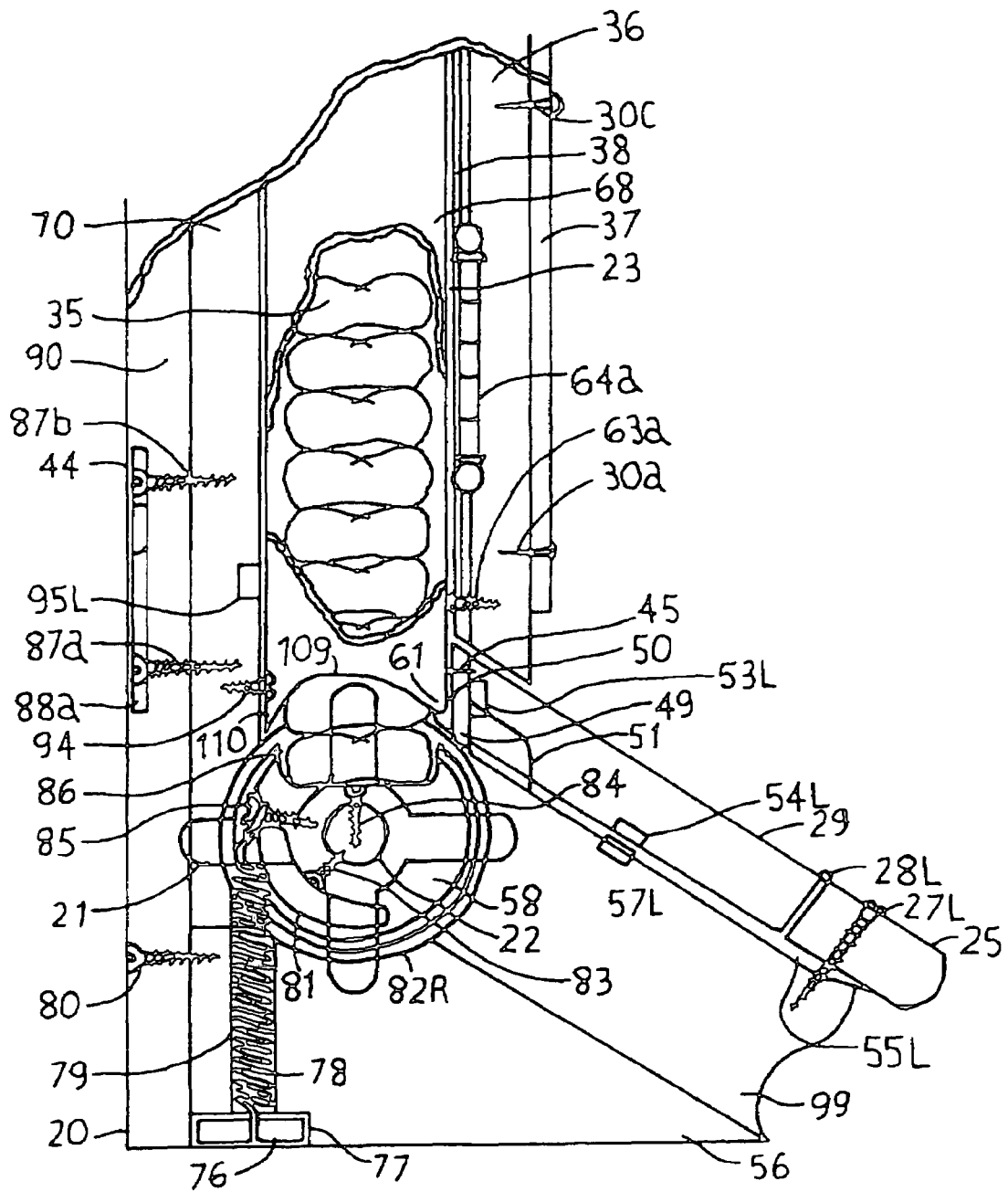
FIG. 5 shows the lower section of the dispenser from the left side with the magazine in use.

FIG. 5 is a fragmentary view of the lower half of FIG. 1 taken from the user's left side with the left side wall 26 removed, and showing use with a magazine 68. A treat stack 35 is shown enclosed inside the magazine 68 with the base treat 35 sitting in the spindle chamber 86. The magazine arch 109, stop tab 61 and the magazine ducktail 110 are all visible at the bottom of the magazine 68. When using a magazine 68 with the dispenser 20, a different rear interior wall 70 is used. A magnet 95 is seen on the rear interior wall 70 along with a magazine mounting screw 94. A spindle rotation groove 81 is cut into the spindle 58. A circular recess 82R is made into the right wall 23 and the left wall 26 (not shown). The spindle 58 is held in place on the axel 22 by the crank mounting screw 83. The return spring 78 is connected to the back side of the spindle 58 by the return spring mounting screw 85. The return spring 78 is housed inside the plug chamber 77.

Located at the top of the rectangular housing 44, the rear exterior wall 90 can be seen mounted to the rear interior wall 70 by use of a mounting bracket 88a and fasteners 87a, 87b. When a magazine 68 is in use, rear interior wall 70 is used. Also located on the front of the rectangular housing 44 is a door 36 connected to the left wall 26 using hinge 64a. The door 36 has a trim piece 37 that is connected to the front of the door 36 using fasteners 30a, 30c. Located on the back side of the door 36 is glass 38 that is fastened to the door 36 using fastener 63a. Just below the door 36, the chute lid 29 can be seen where it is attached to the chute cover 25 by use of hinges 28L, 28R and connected to the right wall by fastener 27. Chute lid magnets 53, 54 can be seen as door closures where they meet magnets 57 and magnet 59 (not shown). Located on the top end of the chute lid 29 is a retaining strip 49 that is fastened to the chute lid 29 by fastener 45. The retaining plate 50 is fastened to the retaining strip 49 by fastener 46. Located under the top section of the chute lid 29 is the chute lid recess 51. Located under the chute cover 25 and chute lid 29 is the chute lid guide 55. Just under the chute lid 29 is the chute output 99. At the bottom of the dispenser 20 is where the base block 56 is joined to the rear exterior wall 90 by use of fasteners 80.

The bottom treat is sitting in the spindle chamber 86. The loaded magazine 68 is held into position by a hold down screw 94 and a retaining clip 98. Magnets 95L, 95R are also used to hold the magazine 68 into position when made of metal. When the magazines 68 are made of other materials such as plastic the hold down screw 94 and the retaining clip 98 keep the magazine 68 in place.

Figure 6:
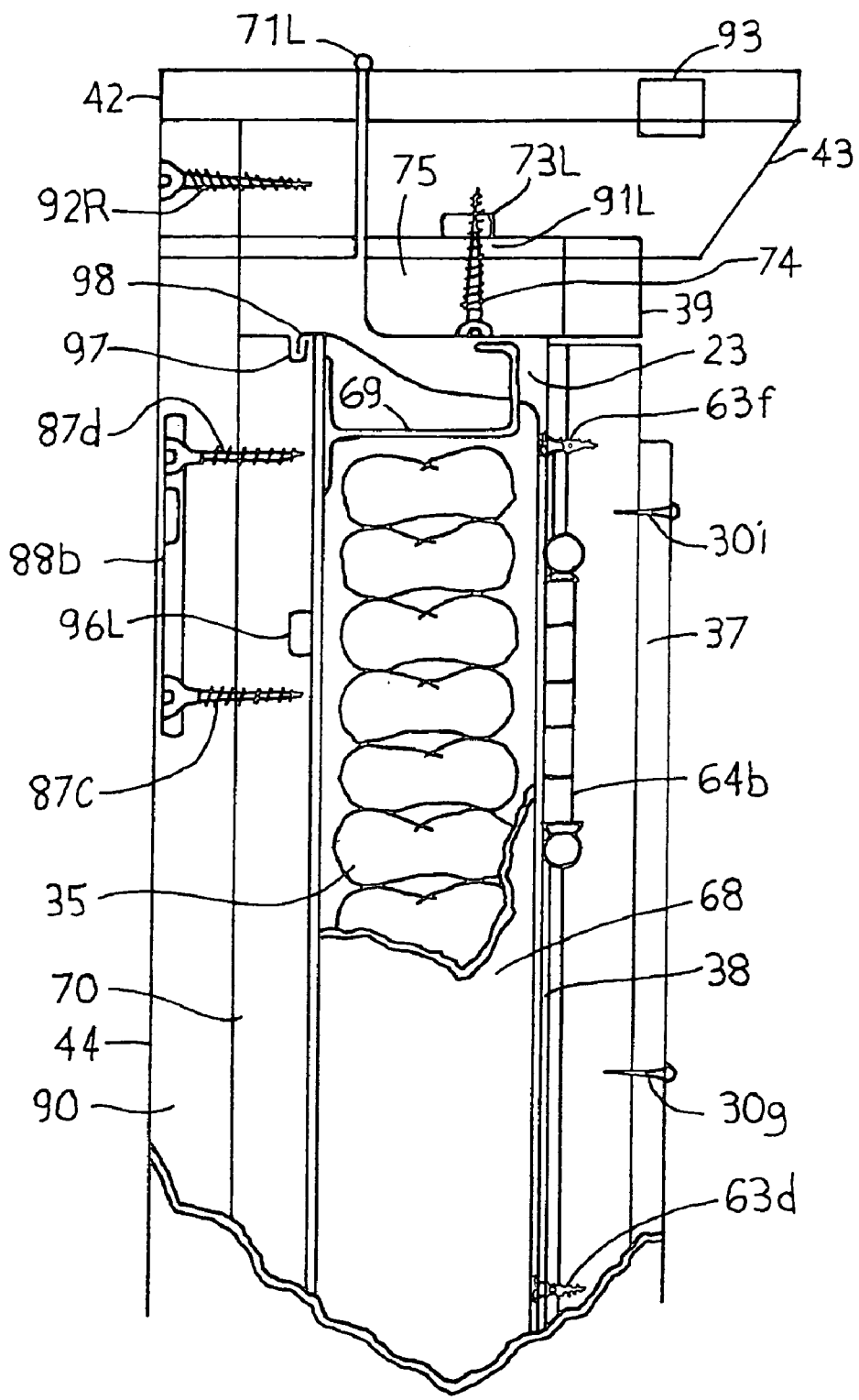
FIG. 6 shows the upper section of the dispenser from the left side with the magazine in use.

FIG. 6 is a fragmentary view of the upper half of FIG. 1 taken from the user's left side with the left side wall 26 removed, and showing use with a loaded magazine 68. Rear interior wall 70 is cut short of the capital 42 section and a slot 97 is cut in the top end of the rear interior wall 70 that runs parallel to the back of the loaded magazine 68. A retaining clip 98 and slot 97 serve to form a male/female connection. Carry handle/stop 69 also serves as a stop to keep treats 35 from exiting the end of the loaded magazine 68 when inverted or tilted during loading. Magnets 96L and 96R (not shown) are mounted into the rear interior wall 70. Magnets mounted into the rear interior wall 70 are not necessary when using a metal magazine 68 and are optional.

Figure 7:
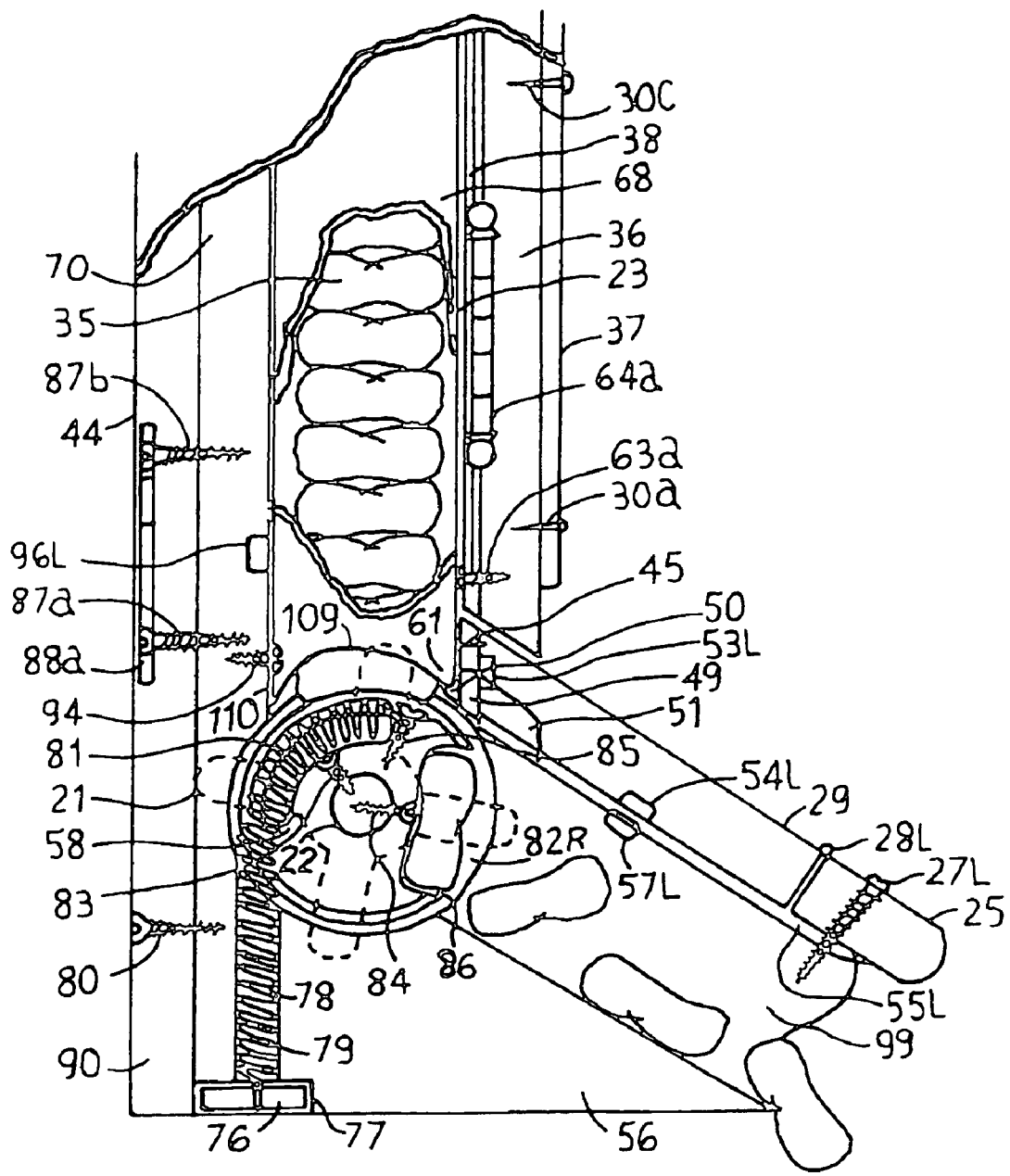
FIG. 7 shows the lower section of the dispenser from the left side with a magazine and in operation.

FIG. 7 is a fragmentary view of the lower half of FIG. 1 taken from the user's left side with the left wall 26 removed. This view also shows use of a loaded magazine 68 and illustrates the delivery of treats 35 through the chute output 99. This view also illustrates the spindle 58, spindle chamber 86, spindle return spring 78, crank 21 and crank axel 22 all in motion. Treats 35 are viewed exiting the chute output 99.

Figure 8:
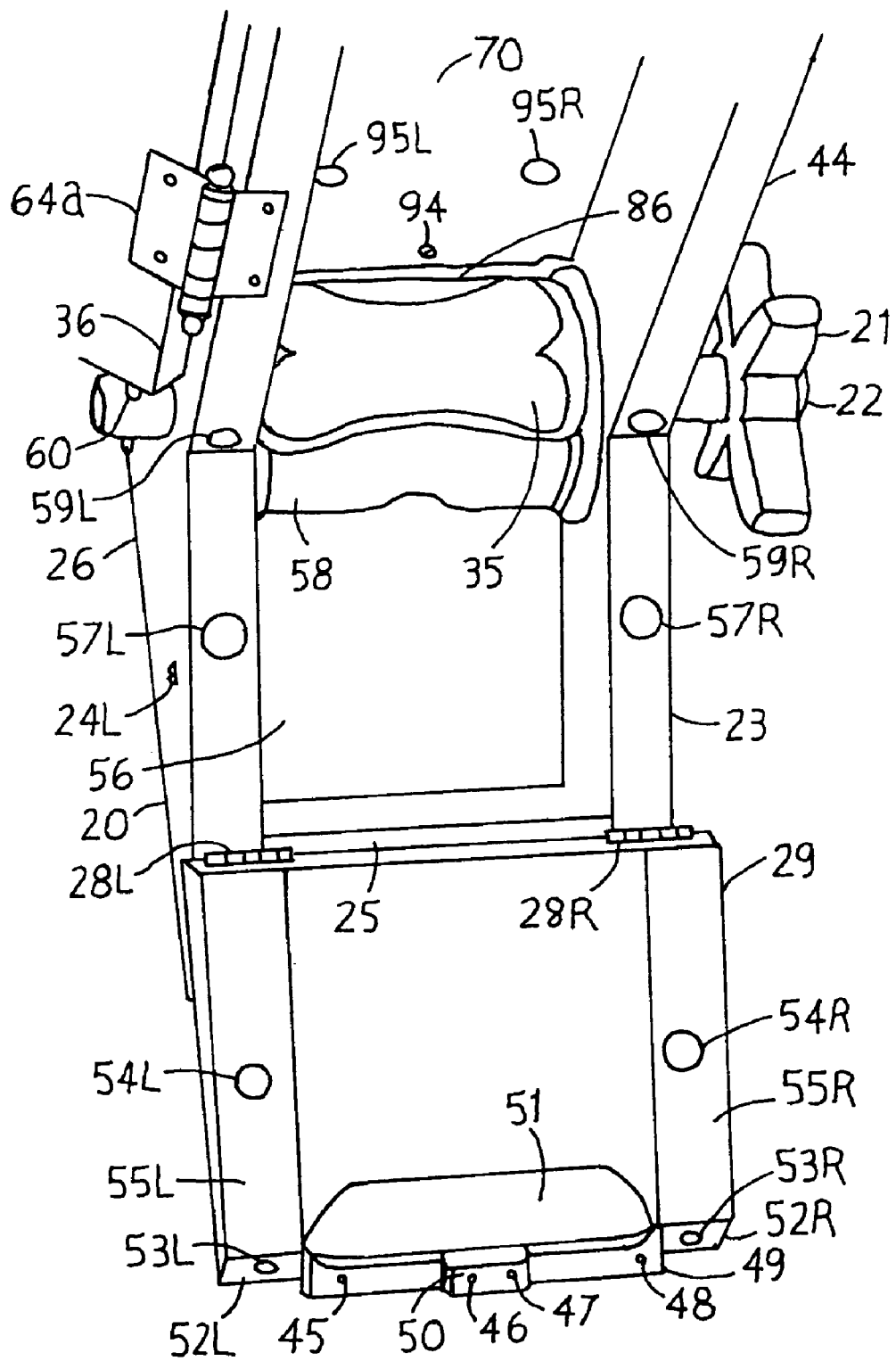
FIG. 8 shows the lower section of the dispenser from the front with a treat in the spindle chamber.

FIG. 8 is a fragmentary enlarged front view of the lower half of FIG. 1, showing the dispenser 20 with the rectangular housing door 36 and the chute lid 29 in the open position. No magazine is shown in FIG. 8, just a treat 35 is visible atop the spindle 58 laying in the spindle chamber 86. Magnets 95L, 95R along with the magazine mounting screw 94 are mounted on the rear interior wall 70. Hinge 64a is mounted to the rectangular housing door 36 and hinges 28L, 28R are mounted on the chute lid 29. The right wall 23 and left wall 26 of the dispenser 20 are shown. With the chute lid 29 open, magnets 54L, 54R, 57L, 57R, 53L, 53R, 59L, 59R can be seen. Running horizontally through the spindle 58 is the axel 22 with the axel pin 60 on one end and the crank 21 on the other end. Below the spindle 58 is the base block 56. the left wall 26 is secured to the base block 56 by the fastener 24L.

Located under the chute lid 29 is the chute cover 25. With the chute lid 29 in the open position the chute lid recess 51 is visible along with chute lid guides 55L, 55R. the chute lid bevels 52L, 52R are located on the edge of the chute lid 29. The retaining strip 49 and the retaining plate 50 are held in place by fasteners 45, 46, 47, 48.

Figure 9:
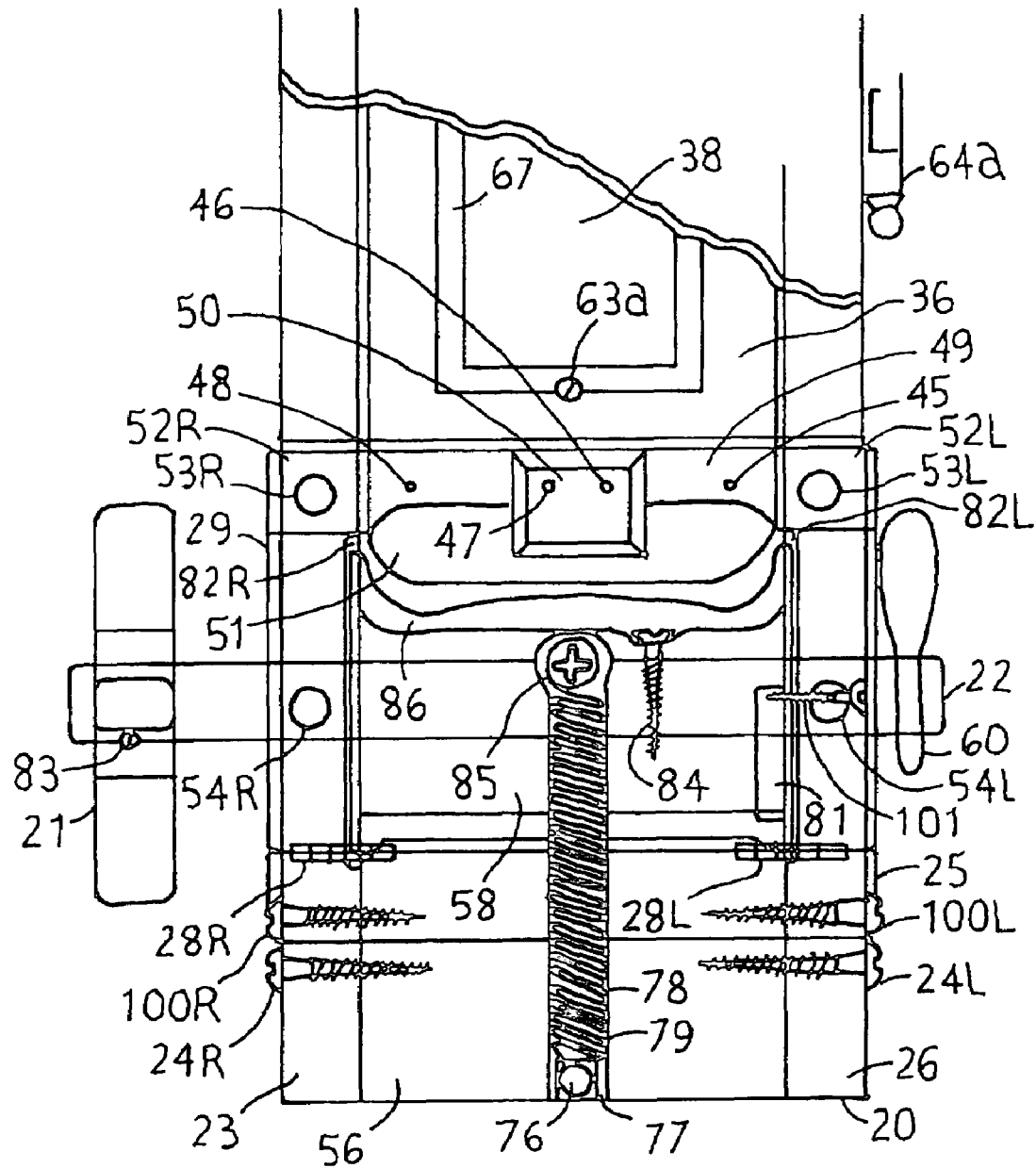
FIG. 9 shows the lower section of the dispenser from the rear.

FIG. 9 is a fragmentary-view taken from the rear of the dispenser 20 showing the lower portion of FIG. 1. The numbers with left and right designation read as if viewing them from the front of the dispenser 20. The rectangular housing door 36 can be seen overlapping the chute lid 29. A slot 67 accepts the glass 38. The door 36 is shown mounted. Magnets 53L and 53R are mounted into the chute lid 29 bevel areas 52L and 52R. Retaining strip 49 and retaining plate 50 are mounted to the chute lid 29. This view also illustrates how the spindle return spring 78 is mounted in the center of the spindle 58 and the mounting of the spindle mounting screw 84 along with the rotation stop screw 101.

Figure 10:
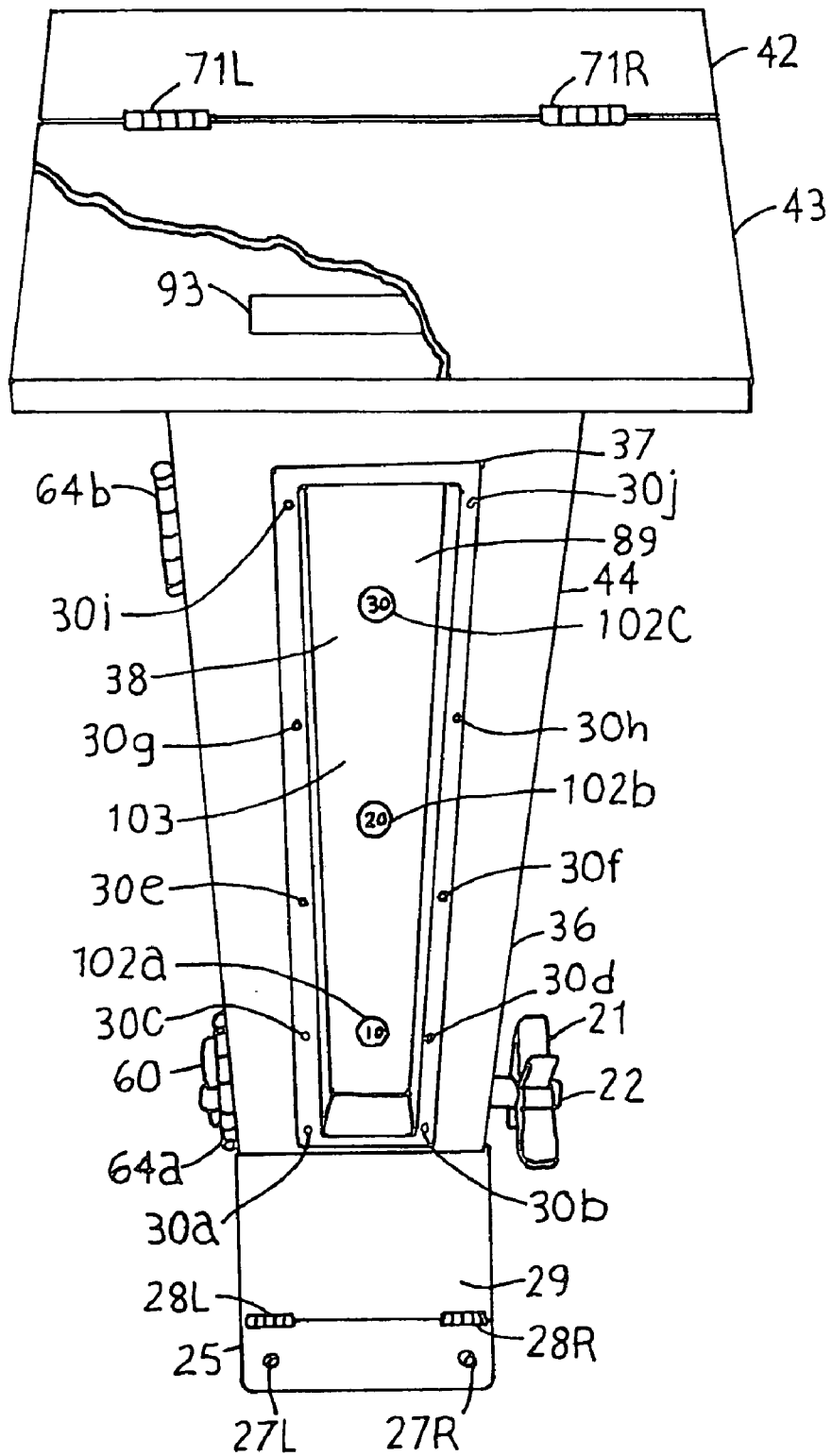
FIG. 10 shows an overhead view of the dispenser from the front and top.

FIG. 10 is a perspective view taken from the user's front showing an overhead and frontal view. Capital 42, 43 are shown with a counterweight 93 mortised into the capital lid 43. Quantity designation numbers 102*a,b,c* are shown placed on the glass 38 or the rear interior wall 89 and are for use when a magazine 68 is not used. These numbers are not necessary.

Figure 11:
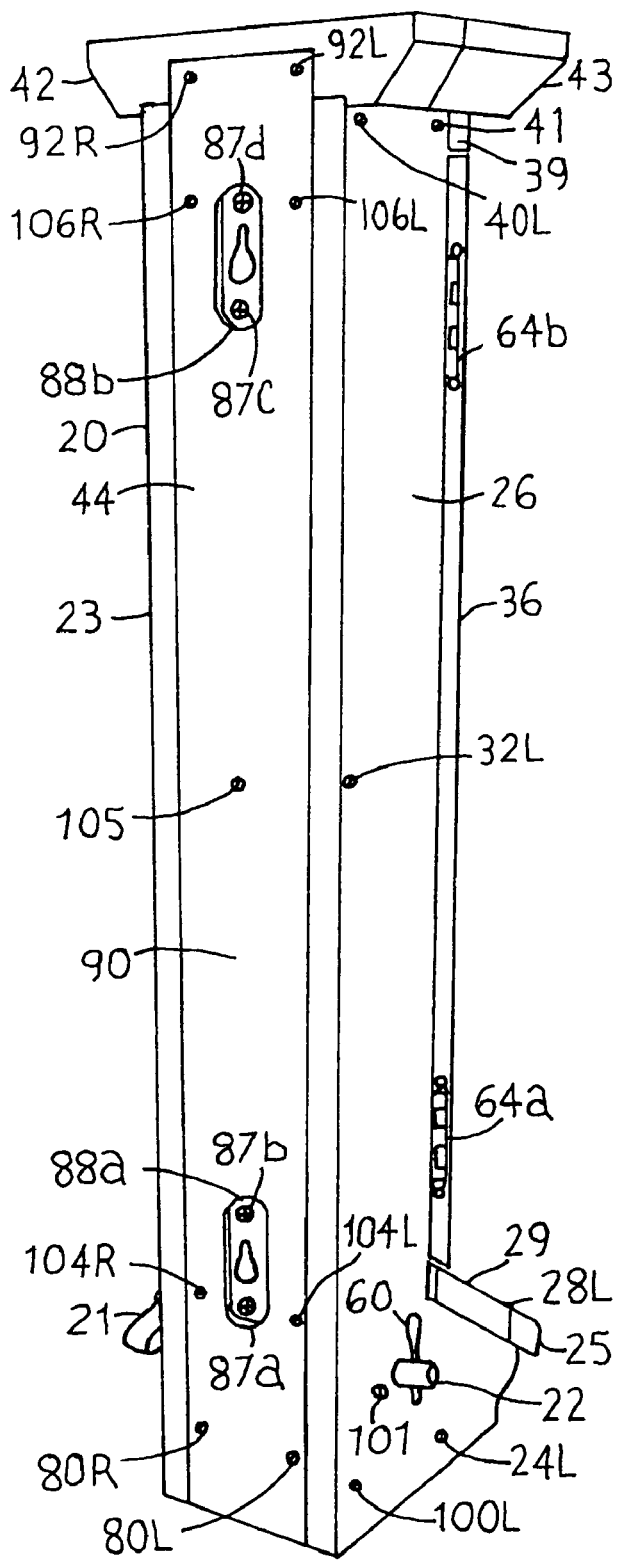
FIG. 11 shows an upright view of the dispenser from the rear and left side.

FIG. 11 is a perspective view of the dispenser 20 showing the rear and the left side. The numbers with left or right designation read as if viewing them from the front of the dispenser. This view shows the capital section 42 connected to the rear exterior wall 90 by fasteners 92L, 92R. The rear exterior wall 90 is connected to the rear interior wall (not-shown) by threaded fasteners 80L, 80R, 104L, 104R, 87*a*, 87*b*, 105, 87*c*, 87*d*. The left wall 26 is connected to the rear exterior wall 90 using threaded fasteners 100L, 32L, 40L.

Figures 12A, 12B, 12C, 12D:
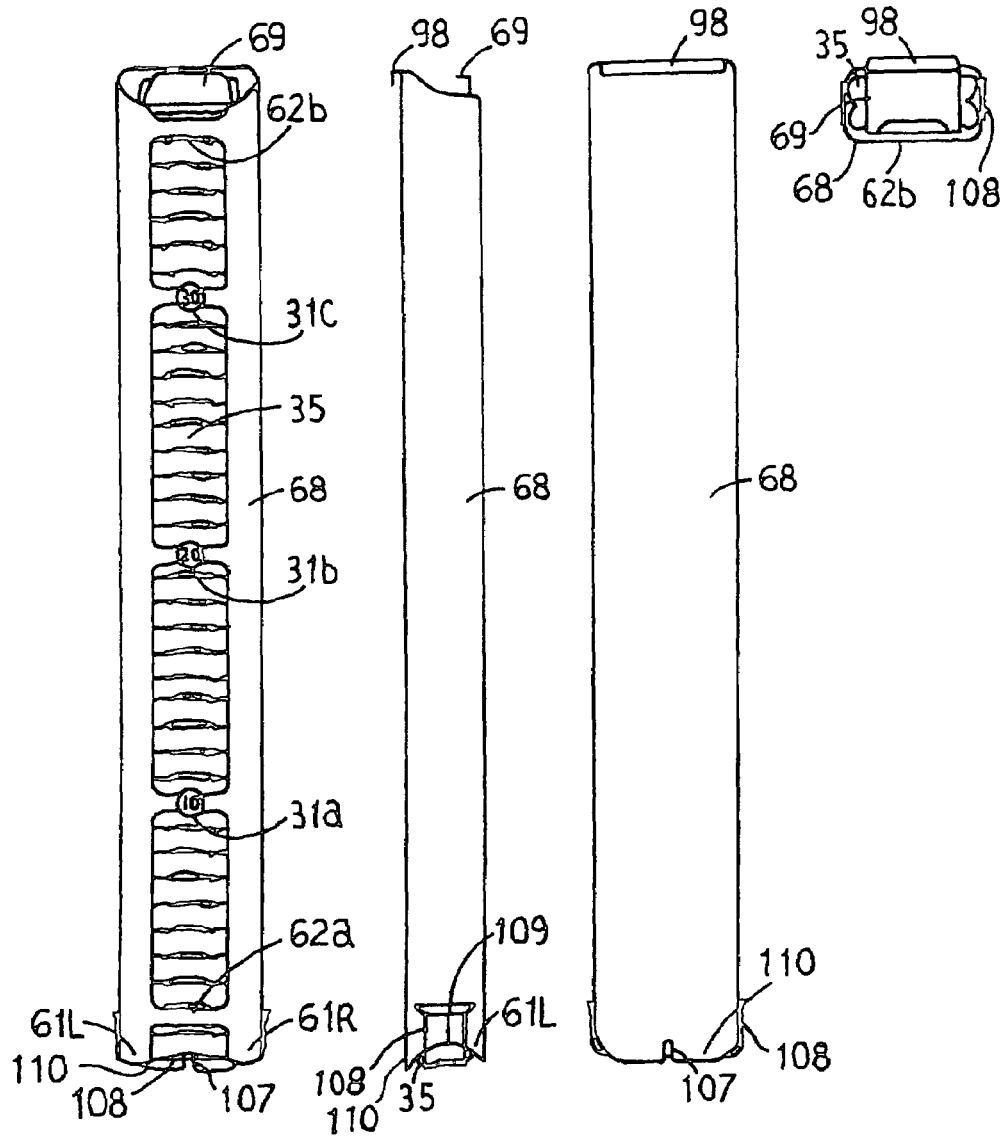
FIG. 12 shows a preloaded magazine from the front (FIG. 12A), side (FIG. 12B), rear (FIG. 12C), and cross-section (FIG. 12D).

FIG. 12 is a perspective view taken from the front, side, rear and cross-section of a loaded magazine 68 showing it loaded with a treat stack 35. In the front view of FIG. 12A, cross-supports 62*a*, 62*b* are located at the top and bottom of magazine 68 for support. Also, other cross-supports 31*a*, 31*b*, 31*c*, each of which can have treat 35 quantity numbers, are located between cross-supports 62*a*, 62*b* for added structural support and to let the user view the remaining treats 35 in the treat stack. Located at the top of the magazine 68 is a carry handle/stop 69 that is used for handling while loading and unloading of magazine 68 along with acting as a stop to prevent the treat stack 35 from exiting through the top of the magazine 68. Stop tabs 61L, 61R, which allow only one treat from the treat stack 35 to exit magazine 68 at a time, are located at the bottom front of magazine 68. Stop tape 108 located at the bottom of the treat stack 35 keeps the treat stack 35 in place during handling and is removed just prior to installation of magazine 68 into dispenser 20. Magazine slot 107 fits over the magazine mounting screw 94 and is located in the center of magazine ducktail 110 at the bottom of magazine 68. When magazine slot 107 is mounted on magazine mounting screw 94 upon installation of magazine 68, they work together to keep magazine 68 in place for proper alignment. Magazine ducktail 110 is located at the bottom of magazine 68 and is shaped to fit just to the top of spindle 58 when magazine 68 is installed. This allows for the proper alignment of the treat stack into spindle chamber 86.

At the bottom is stop tape 108 along with a slot 107 that fits over the hold down screw 94. Also the treat stop tabs 61L, 61R can be seen. The side view shows the spindle arch cut around 109 along with a profile of the treat stop tab 61L. The rear view shows the duck tail bottom 110 and the retaining clip 98. The cross section view shows the magazine 68 as if looking through the magazine 68 from the top.

In the left side view of FIG. 12B, magazine retaining clip 98 is located at the top of the magazine 68. Magazine retaining clip 98 mates up with interior wall magazine slot 97 to form a male/female connection to hold magazine 68 in place during use. Also at the top of magazine 68 is the handle/stop 69. At the bottom of magazine 68, stop tape 108 can be seen holding the treat stack 35 in place. Magazine ducktail 110 is seen at the bottom left of magazine 68. Also, magazine arch 109 is shaped to conform and fit around spindle wall 115 and is used to help with the proper alignment of the treat stack 35 into spindle chamber 86. Stop tab 61L located on the front of magazine 68 is visible near the bottom.

In the rear view of FIG. 12C, magazine retaining clip 98 is seen at the top of magazine 68. Located at the bottom of magazine 68 is magazine slot 107, which is located in the lower center portion of magazine ducktail 110. Stop tape 108 also is visible at the bottom.

In the cross-section view of FIG. 12D, magazine 68 is shown as if looking from the top of the magazine 68 down. In this view, handle/stop 69 can be seen along with magazine retaining clip 98. The treat stack 35 is shown inside the center of magazine 68. On the front of magazine 68 is top cross-support 62*b*. The stop tape 108 also is visible.

FIG. 13 is a perspective view taken from the front, side, rear and cross-section of an unloaded magazine 168. The figures in FIG. 13 are generally the same as magazine 68 in FIG. 12 except that the magazine 168 is shown without cross sections 62*a*, 62*b*, 31*a*, 31*b*, 31*c* and the quantity designation numbers 113*a*, 113*b*, 113*c* are on the rear interior wall 112.

Figures 13A, 13B, 13C, 13D:
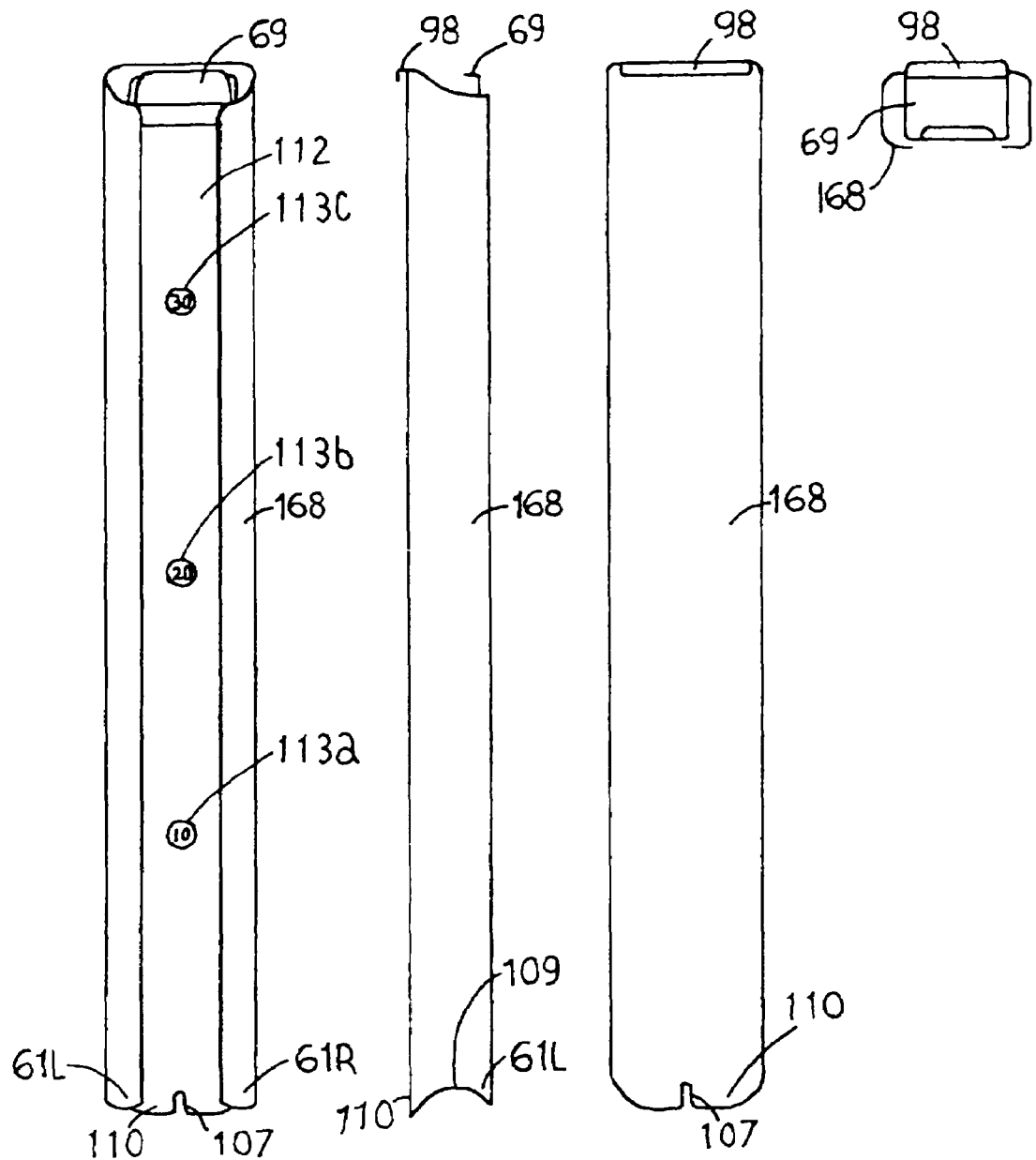
FIG. 13 shows an empty magazine from the front (FIG. 13A), side (FIG. 13B), rear (FIG. 13C), and cross-section (FIG. 13D).

In the front view of FIG. 13A, magazine 168 is shown with quantity numbers 113*a*, 113*b*, 113*c* displayed on the rear interior wall 112 of magazine 168. Quantity numbers 113*a*, 113*b*, 113*c* let the user know the number of treats 35 left in magazine 168 were it loaded and in use in dispenser 20. Located at the top of magazine 168, handle/stop 69 is visible. Handle/stop 69 is used for handling while loading and unloading of magazine 168 along with acting as a stop to prevent the treat stack 35 from exiting through the top of magazine 168. Stop tabs 61L, 61R, which allow only one treat from the treat stack 35 to exit magazine 168 at a time are located at the bottom front of magazine 168. As shown in FIG. 12, stop tape 108 can be used in magazine 168 were magazine 168 loaded with treats 35. Located in the center of ducktail 110 is magazine slot 107. When magazine slot 107 is mounted on magazine mounting screw 94 upon installation of magazine 168 they work together to keep magazine 168 in place and properly aligned. Magazine ducktail 110 is located at the bottom of magazine 168 and is shaped to fit just to the top of spindle 58 when the magazine 168 is installed. This allows for the proper alignment of the treat stack 35 into spindle chamber 86.

In the left side view of FIG. 13B, magazine retaining clip 98 is located at the top of magazine 168. Magazine retaining clip 98 mates up with interior wall slot 97 (not shown) to form a male/female connection and hold magazine 168 in place during use. Located at the top of magazine 168 is handle/stop 69. Located at the bottom of magazine 168 is ducktail 110. Magazine arch 109 is shaped to conform around spindle wall 115 and is used to help with the proper alignment of a treat stack 35 into spindle chamber 86. Left stop tab 61L is visible on the front side of magazine 168 near the bottom.

In the rear view of FIG. 13C, magazine retaining clip 98 is seen at the top of magazine 168. Located at the bottom of magazine 168 is magazine slot 107. Magazine slot 107 is located in the lower center portion of magazine ducktail 110.

In the cross-section view of FIG. 13D, magazine 168 is shown as if looking from the top of the magazine 168 down.

Handle/stop 69 is seen in the center portion of magazine 168 and magazine retaining clip 98 is also visible.

Figure 14:
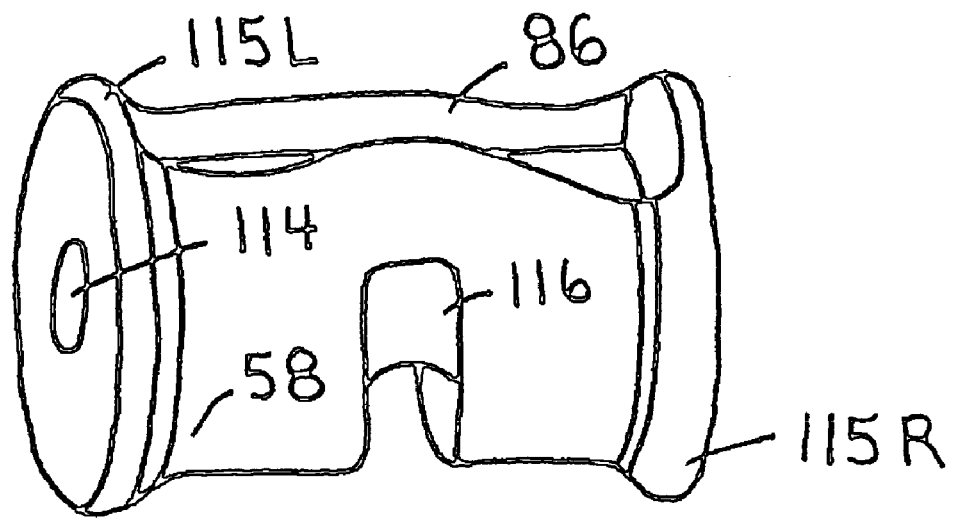
FIG. 14 is a perspective front view of a spindle suitable for use with the invention.

FIG. 14 is a perspective of the spindle 58 removed from the dispenser 20 (not shown) showing it from the front. The spindle chamber 86 is shown at the top of the spindle 58 along with left and right spindle walls 115L and 115R. Located through the center of the spindle 58 is a horizontal axel hole 114. Located in the center section of the spindle 58 is the return spring recess 116.

Figure 15:
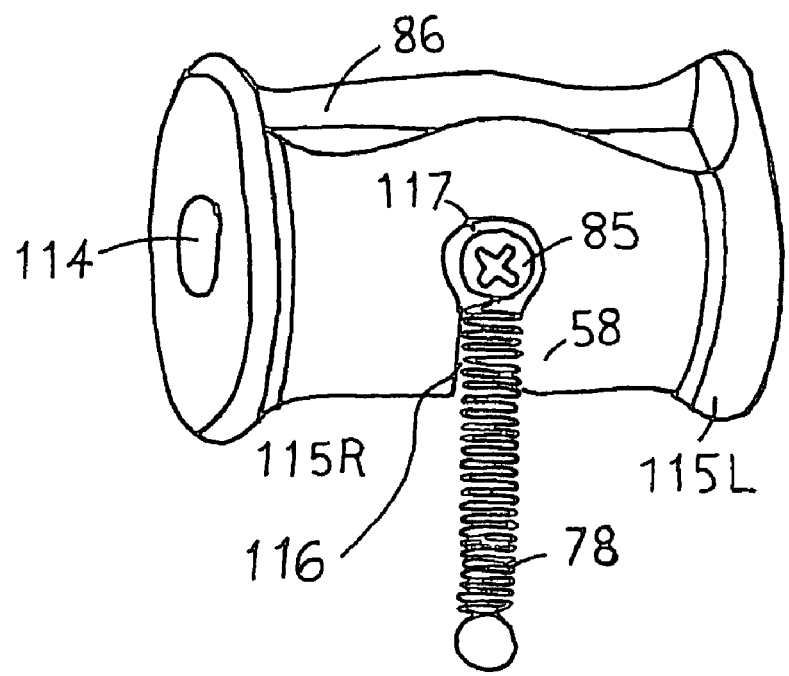
FIG. 15 is a first perspective rear view of the spindle shown in FIG. 14.

FIG. 15 is a perspective of the spindle 58 removed from the dispenser 20 (not shown) showing it from the rear. The spindle chamber 86 is shown at the top of the spindle 58 along with left and right spindle walls 115L and 115R. Located through the center of the spindle 58 is a horizontal axel hole 114. The return spring 78 is shown in the same position that it would be in when assembling the spindle 58 in to the dispenser 20 (not shown). The return spring mounting screw 85 secures the return spring 78 to the return spring mounting recess 117 located above the return spring recess 116.

Figure 16:
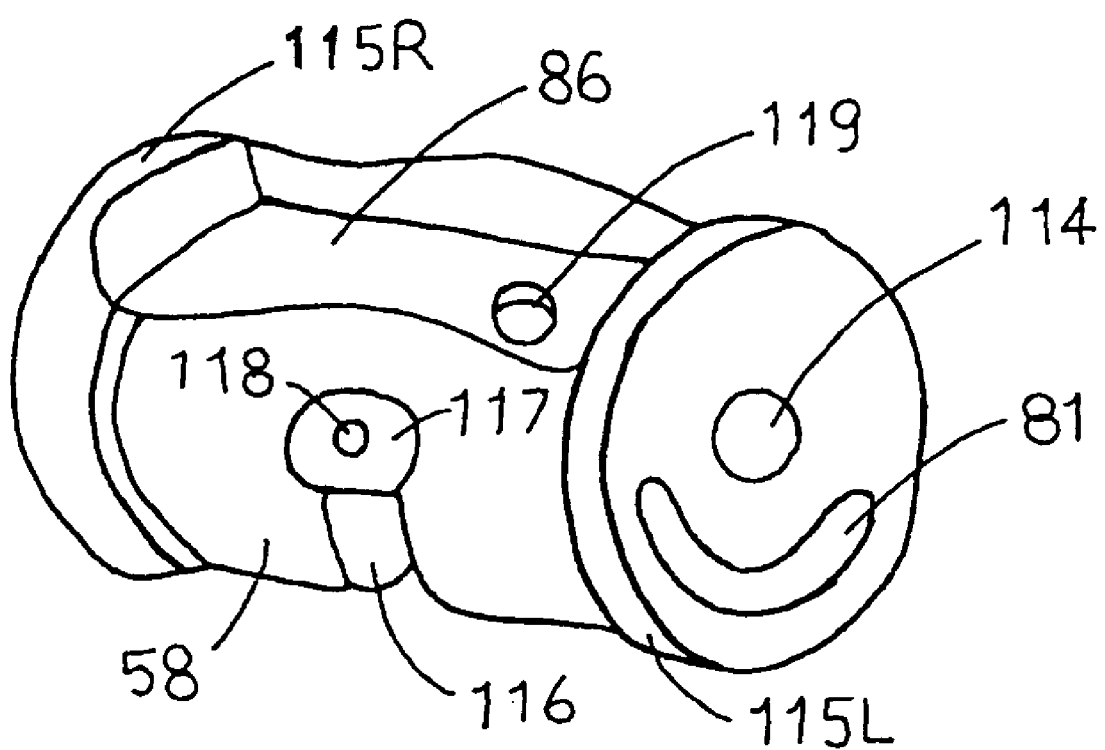
FIG. 16 is a second perspective view of the spindle shown in FIG. 14.

FIG. 16 is a perspective of the spindle 58 removed from the dispenser 20 (not shown) showing it from the rear. The illustration also shows a view of the spindle 58 slightly from above and exposing the left spindle wall 115L. The rear of the spindle 58 is shown without the return spring 78 or the return spring mounting screw 85. The spindle chamber 86 is seen on top of the spindle 58. Inside the spindle chamber 86 the spindle mounting screw recess 119 is visible. Located through the center of the spindle 58 is a horizontal axel hole 114. Located below the axel hole 114 in the left spindle wall 115L is a spindle rotation grove 81. Located in the center section of the spindle 58 is the return spring mounting recess 117 and located in the center of the return spring mounting recess 117 is a screw pilot hole 118. Below the return spring mounting recess 117 is the return spring recess 116. Located on the opposite end of spindle 115L is spindle wall 115R.

Operation

In operation one uses the dispenser 20 and magazine 68 or 168 in a normal manner. The dispenser will operate in two different modes. One is with a magazine 68 or 168 and the other is without a magazine 68 or 168. First mode discussed will be with a magazine 68. Since magazines 68 and 168 are similar I will refer to magazine 68 only. When using the dispenser 20 it can be mounted to a wall using the mounting brackets 88a,b located on the rear exterior wall 90, these allow for fast mounting and dismounting. When using a magazine 68 in the dispenser 20 the rear interior wall 70 is required. This wall is thinner than the rear interior wall 89 that is used when operating the dispenser 20 without a magazine 68.

The magazine 68 is designed so a manufacturer of animal treats 35 can ship their product already loaded in the magazines 68, and the user removes them from packaging and then loads them into the dispenser 20. If the user decides to use the dispenser 20 without a magazine 68, then the user manually loads the dispenser 20 as described later in the operation without a magazine section.

When loading a magazine 68, access to the interior of the rectangular housing 44 is gained by lifting the capital lid 43. By lifting, the magnetic pulls 73L, 73R, 91L, and 91R will disengage allowing the user to position the capital lid 43 in the upright position and rest it against the wall. The counterweight 93 keeps the lid from falling.

Next disengage the door latch 33 and pull the rectangular housing door 36 open. The magnetic pulls 65, 66 will disengage. Next the chute lid 29 is opened by pulling at the top center and toward the user. Magnetic pulls 59L, 59R, 57L, 57R, 54L, 54R, 53L and 53R will disengage and allow the chute lid 29 to rest on the chute cover 25. These pulls keep the chute lid 29 tightly closed since treats 35 can sometimes hit against the retaining strip 49 and retaining plate 50. Now the dispenser 20 interior is exposed. See (FIG. 8) with the spindle 58 and spindle chamber 86 in the upright position along with the return spring 78 contracted the dispenser 20 is now ready to accept a magazine 68.

Operation with a Magazine 68

To load a magazine 68 the user positions the magazine 68 in one hand with the bottom tilted upward. With the other hand removes the stop tape 108. Next place a finger on the bottom treat 35 and return the magazine 68 to the upright position. Now using the carry handle/stop 69 guide the magazine 68 into the interior of the dispenser 20 while lining up the retaining slot 107 over the hold down screw 94. At the same time guide the retaining clip 98 over the retaining slot 97 and push the magazine 68 back and downward while removing your finger. The magazine 68 will settle onto the hold down screw 94 and into the retaining slot 97. The bottom treat 35 will fall into the spindle chamber 86. When using a metal magazine 68 the rear interior wall 70 can have magnetic pulls 95L, 95R, 96L, 96R but are not necessary. When using a plastic or other material for a magazine 68 the hold down screw 94 and the retaining clip 98 along with the rectangular housing door 36 keep the magazine 68 in position.

At this point the chute lid 29 can be closed and the magnetic pulls 53L, 53R, 54L, 54R, 57L, 57R, 59L and 59R will engage and secure the chute lid 29. The rectangular housing door 36 can be returned to the closed position and the magnetic pulls 66 and 65 will engage. Next close the door latch 33 with the latch stud 34. Now the capital lid 43 is pulled down to the closed position and the magnetic pulls 73L, 73R, 91L and 91R will engage and secure the lid 43.

The dispenser 20 is now considered closed and loaded, and is now ready for delivery of animal treats 35. When cycling treats 35 through the dispenser 20 the magazine 68 has treat stop tabs 61L and 61R that keep the treats 35 from exiting more than one at a time. The treat tabs 61L and 61R also keep the treats 35 from jamming the magazine 68 and the spindle chamber 86. With the magazine 68 in place delivery of treats 35 is achieved by turning the hand crank 21 forward approximately ⅓ turn forward toward the user. The hand crank 21 is connected to the crank axel 22 along with the spindle 58. A spindle return spring 78 is also connected to the spindle 58 and to the spindle base block 56. When the hand crank 22 is turned forward toward the user approximately ⅓ turn the spindle 58 rotates inside the circular recesses 82L and 82R along with the spindle chamber 86 and the crank axel 22. This expands the spindle return spring 78 and puts tension on the crank axel 22. While moving forward the spindle 58 has a spindle rotation groove 81 in the left side that is used with a spindle rotation stop screw 101.

The spindle rotation stop screw 101 prevents the spindle 58 from traveling too far forward once the treat 35 is delivered, or too far backward past the upright position. The spindle return spring 78 when contracted brings the spindle 58 and spindle chamber 86 back to the upright position and the next treat 35 falls into the spindle chamber 86 and the cycle can be repeated. Along with the stop tabs 61L and 61R the chute lid 29 has a retaining strip 49 and a retaining plate 50 that keep the treat stack 35 in proper alignment and prevents jamming, and also allows only one treat 35 at a time to be delivered.

In order to unload an empty magazine 68 the dispenser 20 is left mounted to the wall. Open the capital lid 43, rectangular housing door 36 and the chute lid 29 as previously discussed.

Grip the magazine 68 by the carry handle/stop 69 and lift up until the hold down screw 94 and the retaining slot 97 are cleared and pull outward toward the user until clearing the dispenser 20.

Operation without a Magazine 68

When using the dispenser 20 without a magazine 68 the rear interior wall 89 is required. In order to change the rear interior wall from wall 70 to wall 89 the procedure is as follows. Remove the dispenser 20 from the wall and start by removing threaded fasteners 92L and 92R and lift off capital 43, 42. Next disengage the door latch 33 and remove the hinge pins 64a and 64b and remove the rectangular housing door 36. Next remove the threaded fasteners 27L, 27R and lift off the chute cover 25 with the chute lid 29. Pull the rolling pin 60 from the crank axel 22. Now remove the spindle mounting screw 84 and then remove threaded fasteners 40L, 32L, 100L, 24L. Now lift off the left wall 26 with the spindle rotation stop screw 101 left in place. Next let the spindle 58 roll backward until the spring plug 76 falls out of the plug chamber 77 and then slide the hand crank 21 and crank axel 22 out together. Now rotate the spindle 58 forward and out until the spindle return spring 78 clears. Now remove threaded fasteners 80L, 80R, 104L, 104R, 87a,b, 105, 87c,d, 106L, 106R and remove the rear interior wall 70 and replace it with rear interior wall 89. Do not break down rear exterior wall 90 from the right wall 23 and the spindle base block 56.

Once the rear interior wall 89 is inserted and everything reassembled in reverse order the dispenser 20 is now ready for loading. Lay the dispenser 20 in your left hand with the capital 42, 43 elevated approximately 45 degrees. Next open the capital lid 43 and let it rest in the open position. Now open the door latch 33, and open the rectangular housing door 36 until it rest on the user's wrist. Now open the chute lid 29 and let it rest on the chute cover 25. Place one treat 35 in the spindle chamber 86 (see FIG. 8) and then start stacking the treats 35 one on top of the other until a desired quantity is reached. Now keeping the dispenser 20 with the capital 42, 43 elevated 45 degrees close the chute lid 29 followed by the door 36 and engage the door latch 33. Next pull the capital lid 43 to its closed position and bring the dispenser 20 to an upright position. The dispenser 20 is now closed and loaded and ready to remount to the wall for operation.

Three differences in the operation of using the dispenser 20 without a magazine 68 as compared to use with one are as follows:

1. When not using a magazine 68 the walls 89, 26, 23 and the rectangular housing door 36 acts as the dispenser's 20 own chute to the spindle chamber 86.
2. When not using a magazine 68 the thicker rear interior wall 89 takes up the extra space that a magazine 68 would require. This keeps the treat stack 35 lined up vertically so the treats 35 will fall in the spindle chamber 86 correctly.
3. When not using a magazine 68 this means that there are no stop tabs 61L, 61R. This leaves only the retaining strip 49 and the retaining plate 50 to keep the treats 35 from jamming the spindle chamber 86 or exiting the spindle chamber 86 more than one at a time. The recess 51 also allows the treats 35 not to hit the chute lid 29 when exiting the spindle chamber.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

I claim:

1. An animal food and treat dispenser for dispensing edible bone-shaped treats, the dispenser comprising:
    a section for storing the bone-shaped treats to be dispensed comprising a housing with an interior into which a vertical stack of the bone-shaped treats is placed and a door for accessing the interior of the housing;
    a spindle for dispensing the bone-shaped treats from the section for storing the bone-shaped treats to be dispensed through an output chute, wherein the spindle comprises a cylinder having a spindle chamber formed lengthwise on the outer surface of the cylinder, the spindle chamber having a bone-shaped shape and volume corresponding to the shape and volume of the bone-shaped treats and into which only one of the bone-shaped treats at least partially fits, and wherein when the spindle is rotated to dispense the bone-shaped treat, at least one wall of the spindle chamber forces the bone-shaped treat from the section for storing the bone-shaped treats to the output chute;
    a magazine for holding the bone-shaped treats to be dispensed comprising a vertical chute having right and left side walls for storage of the bone-shaped treats in a uniform and orderly manner and for mating with the spindle chamber, wherein the magazine is retained within the interior of the housing of the dispenser such that the bone-shaped treats fall into the spindle chamber; and
    a curved out section located at the bottom end of the right and left side walls of the magazine and extending up into a portion of the magazine for mating up with side walls of the spindle chamber.

2. The animal food and treat dispenser as claimed in claim 1, further comprising an axle running axially through the spindle for rotationally mounting the spindle within the dispenser below the section for storing the bone-shaped treats.

3. The animal food and treat dispenser as claimed in claim 2, further comprising a return spring tensionally connecting the spindle to the dispenser, wherein the return spring urges the spindle to a receiving position for receiving one of the bone-shaped treats and urges the spindle from a dispensing position back to the receiving position.

4. The animal food and treat dispenser as claimed in claim 3, further comprising a recess on an end of the spindle for accepting a stop screw, wherein the recess cooperates with the stop screw to limit motion of the spindle to a rotational arc between the receiving position and the dispensing position.

5. The animal food and treat dispenser as claimed in claim 1, wherein the vertical stack of the bone-shaped treats comprises a plurality of the bone-shaped treats stacked one atop another.

6. The animal food and treat dispenser as claimed in claim 1, wherein the magazine further comprises
    a shape molded to conform around a shape of the bone-shaped treats to keep the bone-shaped treats in the vertical stack.

7. The animal food and treat dispenser as claimed in claim 6, further comprising a hook on a lip at the top end of the magazine for use in conjunction with a slot opening at a bottom end of the magazine for fitting over a hold down screw on the magazine for mounting the magazine in the dispenser.

8. The animal food and treat dispenser as claimed in claim 6, wherein the magazine further comprises cross supports on a front side for giving the magazine structural strength.

9. The animal food and treat dispenser as claimed in claim 6, wherein the magazine is preloaded with the bone-shaped treats.

10. The animal food and treat dispenser as claimed in claim 9, wherein the magazine further comprises a stop tape for preventing the bone-shaped treats from falling out of the magazine prior to use.

11. The animal food and treat dispenser as claimed in claim 6, wherein the magazine further comprises stop tabs for preventing more than one of the bone-shaped treats from being dispensed at a time.

12. The animal food and treat dispenser as claimed in claim 6, wherein the magazine further comprises a handle mounted at a top end of the magazine for loading of the magazine into the dispenser.

* * * * *